Jan. 10, 1967  H. GOLDBERG  3,296,922
APPARATUS FOR DETERMINING OXYGEN SATURATION OF BLOOD
Filed April 22, 1963  6 Sheets-Sheet 1

INVENTOR
HERBERT GOLDBERG
BY J. Albert Valtgren
ATTORNEY

Jan. 10, 1967 H. GOLDBERG 3,296,922
APPARATUS FOR DETERMINING OXYGEN SATURATION OF BLOOD
Filed April 22, 1963 6 Sheets-Sheet 3

INVENTOR
HERBERT GOLDBERG
BY
ATTORNEY

Jan. 10, 1967     H. GOLDBERG     3,296,922
APPARATUS FOR DETERMINING OXYGEN SATURATION OF BLOOD
Filed April 22, 1963     6 Sheets-Sheet 4
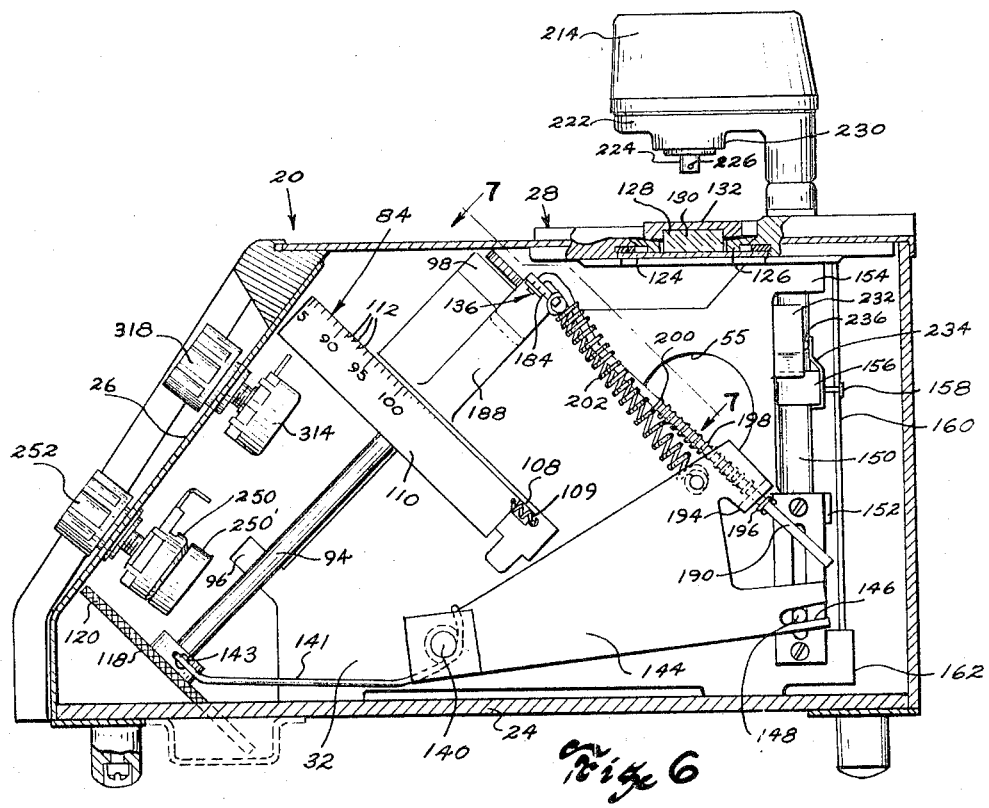
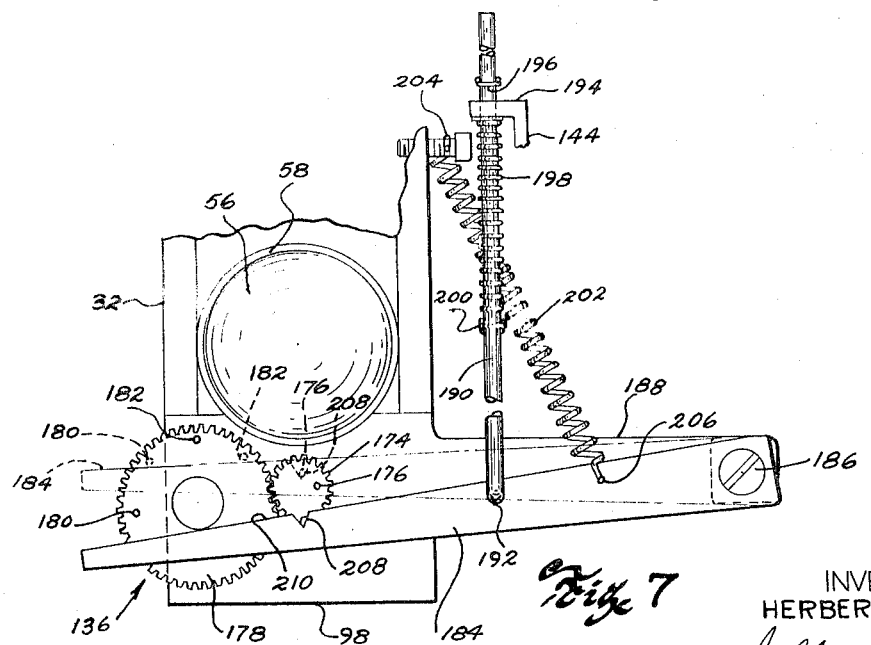
INVENTOR
HERBERT GOLDBERG
BY
ATTORNEY

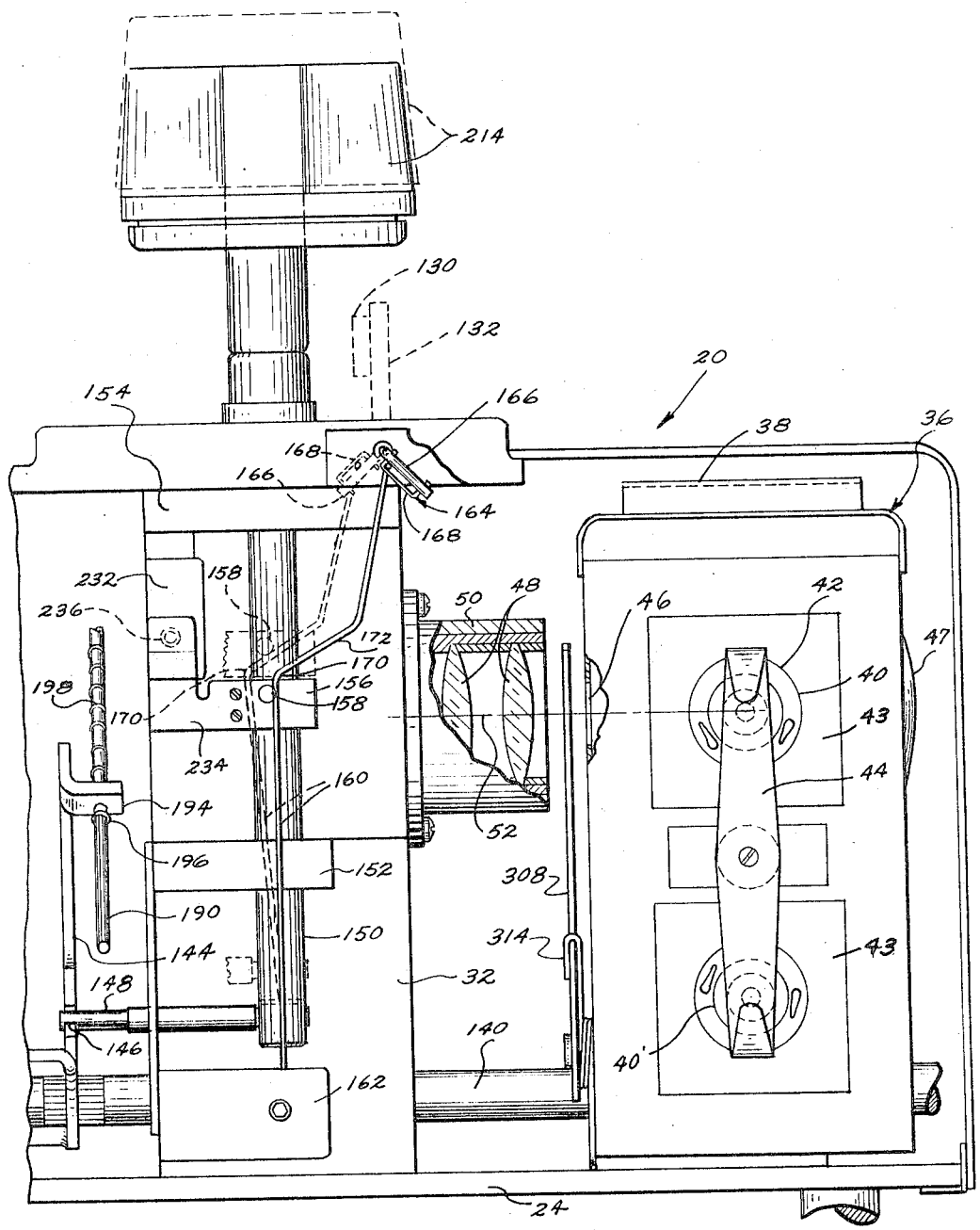

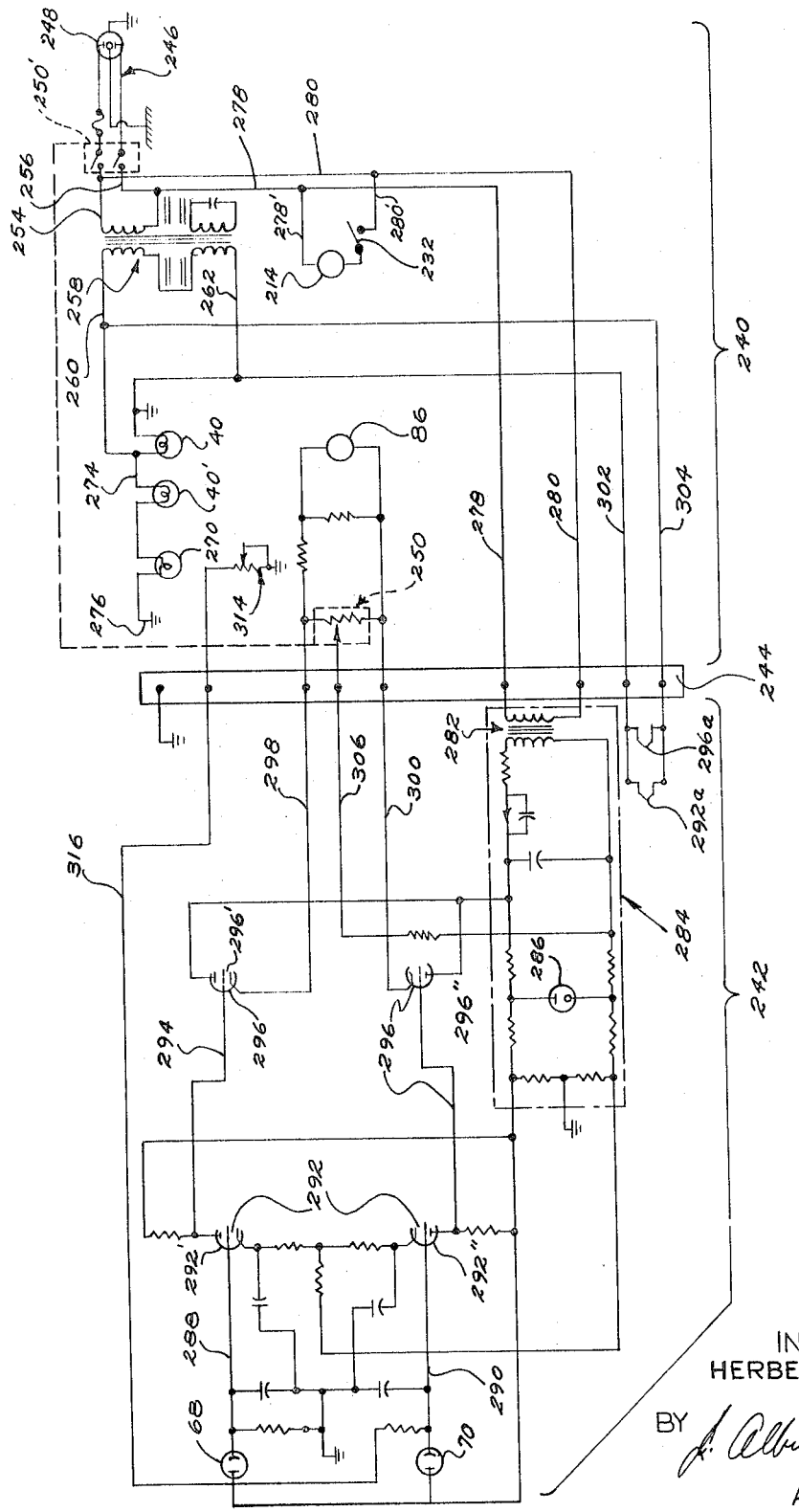

United States Patent Office 3,296,922
Patented Jan. 10, 1967

3,296,922
APPARATUS FOR DETERMINING OXYGEN SATURATION OF BLOOD
Herbert Goldberg, Keene, N.H., assignor to American Optical Company, Southbridge, Mass.
Filed Apr. 22, 1963, Ser. No. 274,636
9 Claims. (Cl. 88—14)

This invention relates to apparatus for evaluating the oxygen saturation of blood and has particular reference to an improved instrument for determining the oxygen saturation of whole blood.

For clinical purposes, the evaluation of the blood's oxygen content offers one of the best determinations of various circulatory and respiratory funtions. The normal arterial oxygen saturation is a homeostatic fundamental with every deviation being highly significant. Accordingly, an object of the present invention is to provide for simple and expedient determination of absolute values of percentage of oxygen saturation of whole blood.

Another object is to provide an instrument for determining the oxygen content of blood which obviates the need for hemolysis, operates independently of the amount of hemoglobin, size shape and concentration of cells in the blood and provides reliable readings of percentage of oxygen saturation in absolute terms unaffected by the geometry of the instrument.

Another object is to provide for the determination of absolute values of oxygen saturation of unhemolized blood by utilizing light of preselected wavelengths diffusely reflected from the blood.

Still another object is the use of the reflection coefficient of preselected wavelengths of light from a sample of blood for an absolute determination of the percentage of oxygen saturation of said sample.

A further object is to provide a novel dual beam electro-optical system for determining percentage of oxygen saturation of whole blood wherein light of one wavelength which is known to be diffusely reflected equally by oxyhemoglobin and reduced hemoglobin in the blood is compared with light of another wavelength which is known to be reflected relatively efficiently by oxyhemoglobin and strongly absorbed by reduced hemoglobin.

A still further object is to provide an instrument of the above character which is uniquely designed for compactness, portability and operation without the requirement for special skills or training.

To attain the aforesaid objects and others which may appear from the following detailed description, in accordance with the principles of my invention, I provide an instrument having an electro-optical system which functions to cause light to be back scattered or diffusely reflected from unhemolized, undiluted blood and to determine from differences in intensities of two different preselected wavelengths of said reflected light, the percentage of oxygen saturation of the blood.

The relationship between oxyhemoglobin and total hemoglobin in blood provides a measure of oxygen saturation and in optically determining oxygen saturation hemoglobin is considered to be present only as oxyhemoglobin and reduced hemoglobin.

In optically determining the relationship between oxyhemoglobin and total hemoglobin, the present invention utilizes a dual beam principle wherein a beam of light of one wavelength approximately (805 millimicrons) which is diffusely reflected from a blood sample is compared with a beam of light of another wavelength (approximately 660 millimicrons) which is simultaneously diffusely reflected from the same blood sample.

The reflected 805 millimicrons beam of light is unchanged in intensity by the amount of oxygen or oxyhemoglobin in the blood whereas the intensity of the reflected 660 millimicron beam of light varies in accordance with the amount of oxygen or oxyhemoglobin in the blood and both are changed substantially equally by variations in the total amount of hemoglobin.

The amount of reflection of light at 805 millimicrons is taken as a standard and the amount of reflection of light at 660 millimicrons is compared therewith. The amount of change of one beam to make it equal in intensity to the other is a measure of oxygen saturation.

Oxygen saturation is determined by attenuating the 660 millimicron beam of light which is reflected from the blood an amount sufficient to match the intensity of the 805 millimicron beam of light reflected from the same blood so as to determine the difference in intensities of the two beams. This is accomplished in accordance with one aspect of the present invention by placing an adjustable variable area light attenuator in the path of said 660 millimicron beam of reflected light in such manner that adjustment of the light attenuator will allow more or less of said light to pass therethrough. The amount of light attenuated to bring about a balance in intensity of the two beams, which is a function of oxygen saturation, is determined by the position to which the light attenuator is adjusted. Calibrations are provided on the light attenuator to read percentage oxygen saturation directly in accordance with adjustment thereof.

In order to determine when a match or balance in intensity of the two beams of light is acheived by adjustment of the light attenuator, there is provided a photoelectric system embodying one photocell which is positioned to receive the beam of light directed through the light attenuator and another photocell positioned to receive the other beam of light. A difference in the electrical output of the photocells which corresponds to the difference in intensities of the light respectively received thereby is indicated by a meter having a pointer normally resting at mid scale and which deflects according to a difference in output of the photocells.

When the meter pointer is not deflected from its normal position of rest, this indicates that the light attenuator is so adjusted as to balance the intensities of light received by respecive photocells and a reading of the calibrations on the light attenuator at this time indicates percentage oxygen saturation of the blood.

Various features of the present invention and details of construction will be more fully understood by reference to the following descrpition which is accompanied by drawings in which.

Figure 3:
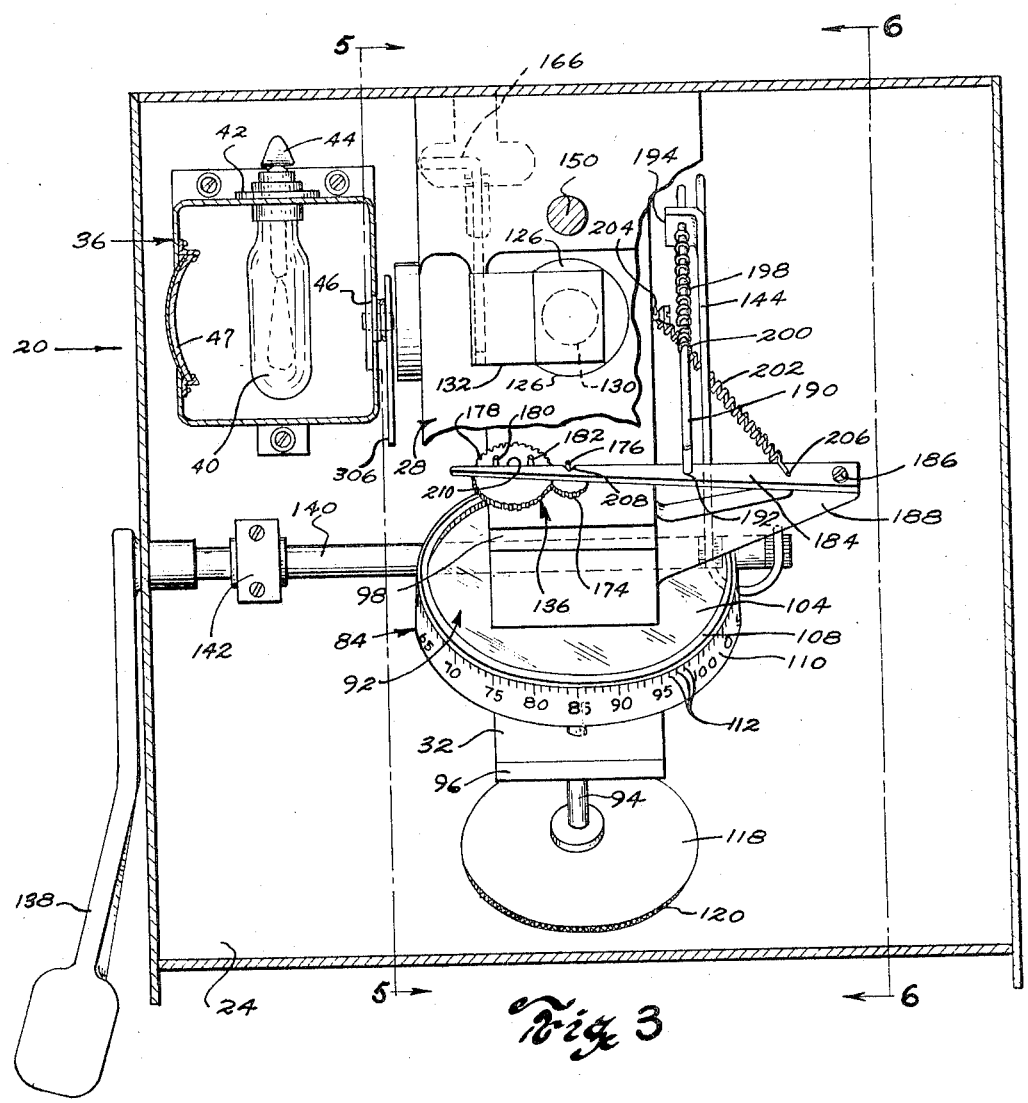
FIG. 3 is a plan view of the embodiment with portions thereof broken away to illustrate internal component parts thereof.
Figure 5:
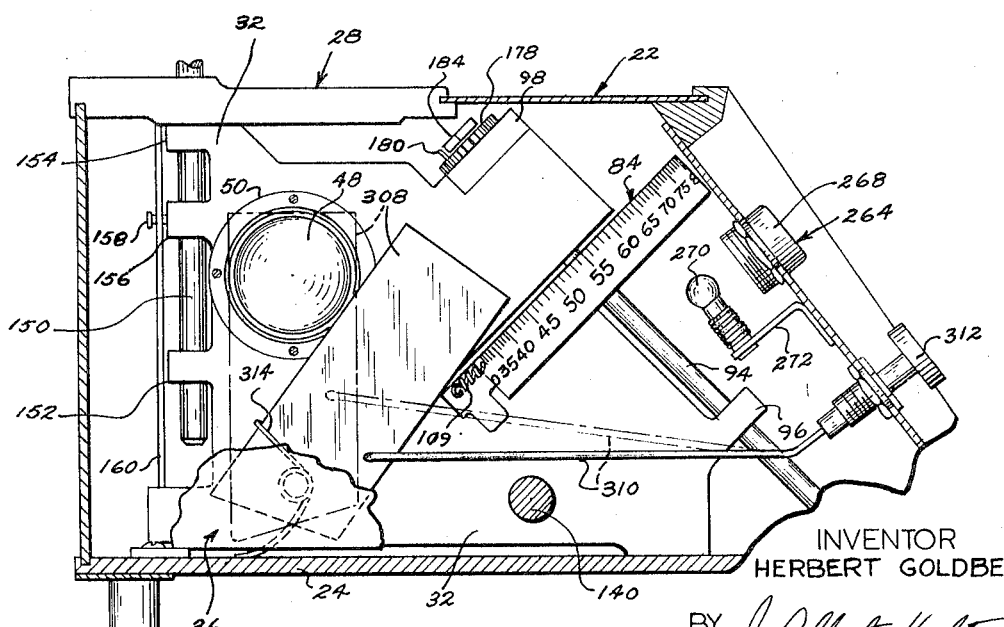

FIGS. 5 and 6 are vertical cross-sectional views taken approximately along lines 5—5 and 6—6 respectively of FIG. 3;

FIG. 7 is a fragmentary view taken along line 7—7 of FIG. 6 looking in the direction indicated by the arrows;

FIG. 8 is a fragmenary rear elevational view of the embodiment of the invention with parts removed to illustrate internal components thereof; and FIG. 9 is a schematic illustration of an electrical system incorporated in the embodiment of the invention.

Figures 1, 2:
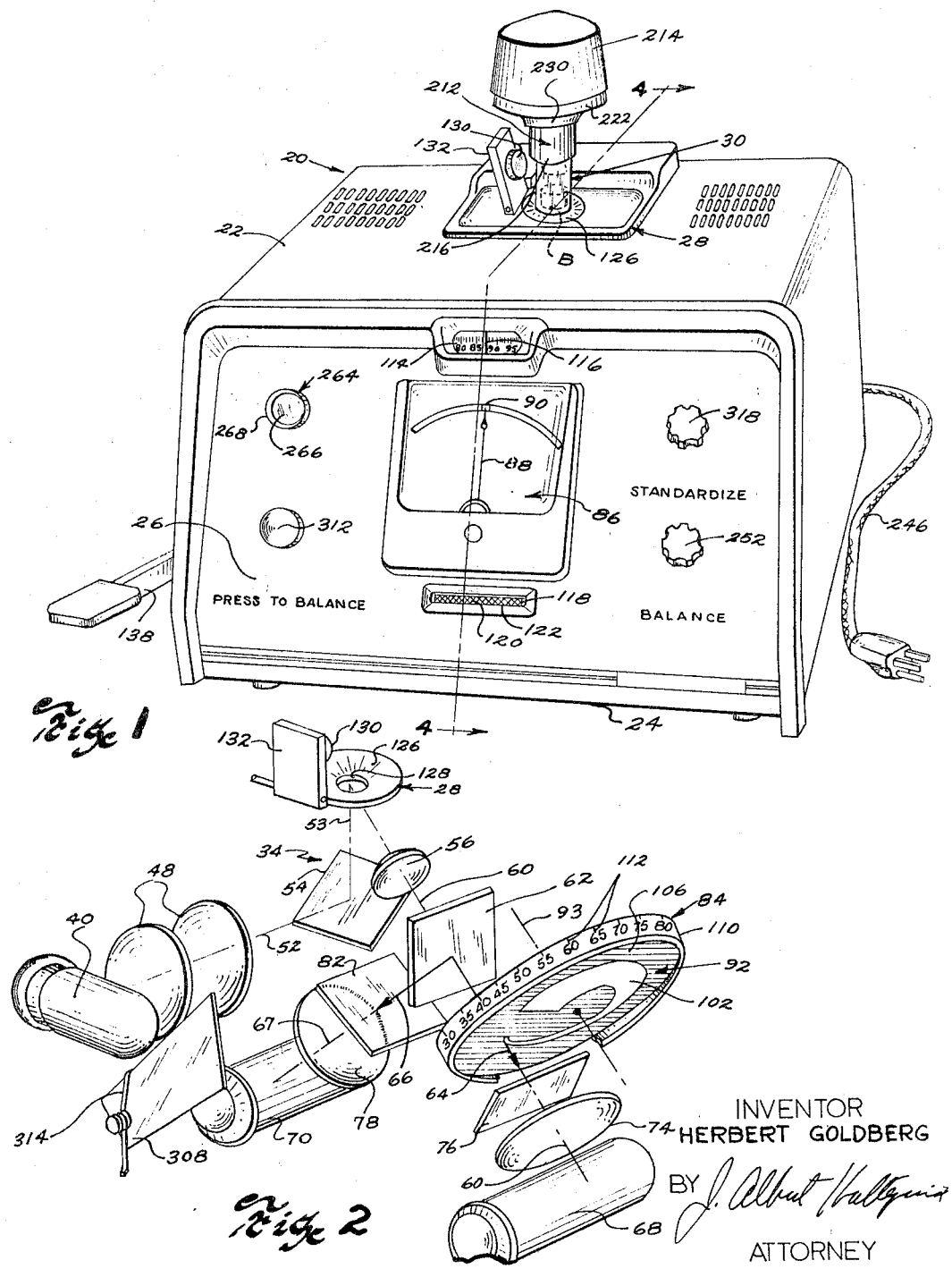
FIG. 1 is a perspective view of an embodiment of the invention.
FIG. 2 is a schematic illustration of an optical system incorporated in the embodiment of the invention.

Referring to the drawings, particularly FIG. 1, there is illustrated an embodiment of the invention comprising instrument 20 which includes cabinet 22 mounted upon base plate 24. Cabinet 22 is provided with forwardly disposed control panel 26 and support 28 at the top rear portion thereof upon which cuvette 30 containing a sample of blood B is placed when it is desired to determine the blood's oxygen saturation.

Internally of cabinet 22 and mounted on base plate 24 is vertically disposed main casting 32 (FIG. 3) which supports optical system 34 shown schematically in FIG. 2. Adjacent casting 32 and disposed to one side thereof is lamp housing 36 supported upon base plate 24. Lamp housing 36 is preferably formed of sheet metal with louvered top 38 being provided to complete the enclosure and which at the same time permits the flow of cooling air over the lamp 40 contained therewithin.

Lamp 40 which may be of the conventional tungsten filament type is removably supported horizontally within the upper section of housing 36 by means of socket 42 provided therefore on the rearwardly disposed side of housing 36 (see FIGS. 3 and 8). Electrically conductive spring arm 44 mounted on housing 36 makes electrical connection with the center terminal of lamp 40 and simultaneously functions to hold lamp 40 securely in socket 42 (see FIG. 8). Arm 44 is electrically insulated from housing 36. In the lower half of housing 36 space is provided to receive replacement lamp 40' similar to lamp 40 and an end of arm 44 opposite to that engaging lamp 40 functions to simultaneously hold replacement lamp 40' in place. Lamps 40 and 40' are electrically insulated from housing 36 by members 43 which support the lamps sockets.

In order to illuminate optical system 34, opening 46 is provided in the side of housing 36 which faces casting 32 (see FIG. 8). Condensing lenses 48 mounted in lens support 50 on casting 32 are coaxially aligned with opening 46 to receive and direct light from lamp 40 along axis 52 of optical system 34 (see FIGS. 2 and 8. Spherically concave mirror 47 is mounted on housing 36 to reflect light rays received thereby along axis 52.

Figure 4:
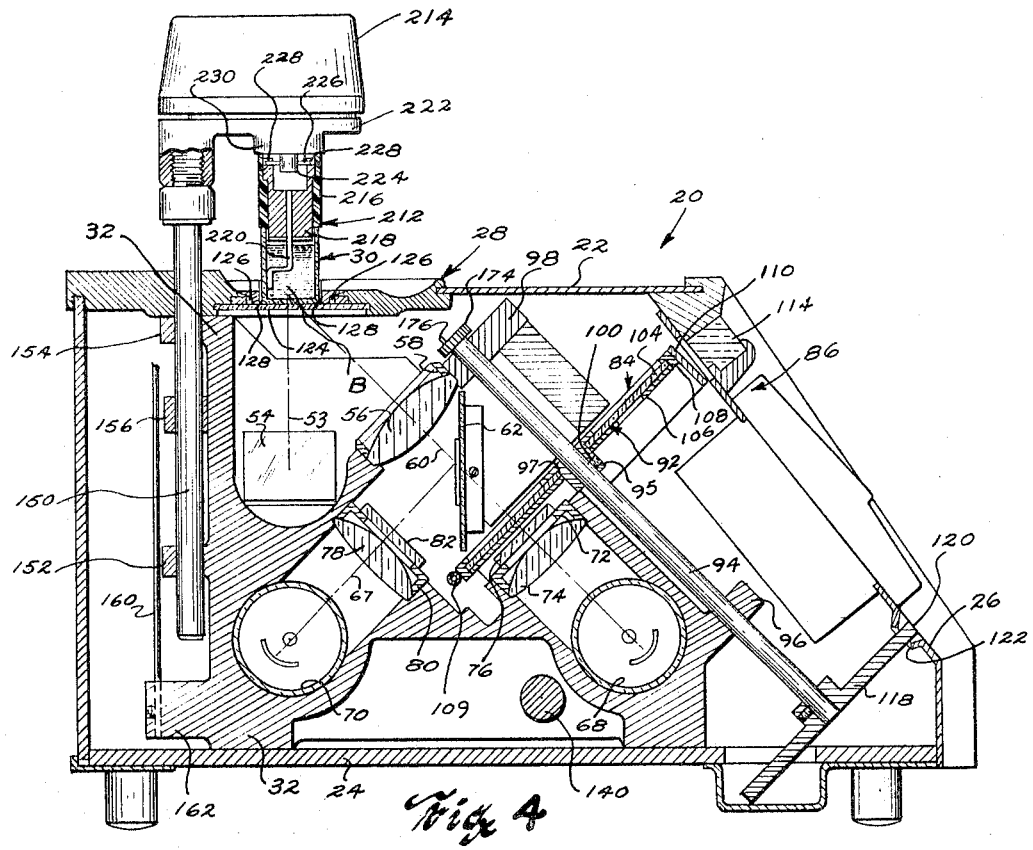
FIG. 4 is a vertical cross-sectional view taken approximately along line 4—4 of FIG. 1 looking in the direction indicated by the arrows.

Referring more particularly to FIG. 2, it will be seen that optical system 34, in addition to condenser lenses 48, embodies heat eliminating mirror 54 which is a dichroic reflector adapted to transmit light in the higher infrared region and reflect other wavelengths. Mirror 54 is positioned within casting 32 directly beneath support 28 as shown in FIG. 4 so as to have its plane surface directed at an angle of approximately 45° relative to axis 52. In this way, mirror 54 reflects a portion of light directed along axis 52 substantially right angularly and upwardly along axis 53 to support 28 so as to illuminate blood sample B contained in cuvette 30 when positioned on support 28. The remaining portion of light directed along axis 52 passes through mirror 54 and is dissipated within cabinet 22.

In the present embodiment of the invention, mirror 54 is chosen to be of such character as to reflect light of all wavelengths between the range of from approximately 500 millimicrons to approximately 900 millimicrons and to pass or transmit infrared light above 900 millimicrons outwardly through opening 55 (see FIG 6) in casting 32 whereby said transmitted light will be dissipated within cabinet 22.

Collimating lens 56 is mounted in casting 32 (see FIGS. 2, 4 and 7) so as to receive a portion of light reflected obliquely from blood sample B positioned upon support 28 and direct said reflected light along optical axis 60. Retainer 58 holds lens 56 in place.

In accordance with the dual beam principle of the present invention, light reflected from a particular blood sample positioned upon support 28 is divided into two portions or beams by the provision of dichroic beam splitter 62 also supported within casting 32. Beam splitter 62 intercepts light directed along axis 60.

Dichroic beam splitter 62 is selected to be of such character as reflect light of wavelengths above approximately 700 millimicrons and transmit light of wavelengths below approximately 700 millimicrons when disposed in the path of light directed thereonto. Beam splitter 62 is supported vertically in casting 32 so as to be disposed at an angle of approximately 45° relative to axis 60 (see FIGS. 2 and 4). In this way light directed along axis 60 is divided by beam splitter 62 into two portions or beams 64 and 66 (see FIG. 2); one beam 64 consisting of light below 700 millimicrons and being transmitted through beam splitter 62 in the direction of axis 60 and the other beam 66 consisting of light above 700 millimicrons and being reflected along another axis 67 disposed at approximately 90° to axis 60.

The interior of casting 32 is provided with a number of cavities as illustrated in FIG. 4 each of which is adapted to receive and support one of a pair of matched photocells 68 and 70 which are disposed along axes 60 and 67 respectively so as to intercept beams of light 64 and 66.

Adjacent photocells 68 and supported in casting 32 by lens retainer 72 (see FIGS. 2 and 4) is light collimating lens 74 and interference filter 76. Filter 76 is so characterized as to transmit only a narrow wavelength band of light centered at approximately 660 millimicrons so that photocell 68 will receive substantially only the 660 millimicron light of beam 64 which is directed thereonto by lens 74. Filter 76 is cemented or otherwise fixed to retainer 72.

A similar lens and filter arrangement is provided adjacent photocell 70 wherein collimating lens 78 is supported in casting 32 by retainer 80 and interference filter 82 is cemented or otherwise fixed to retainer 80. Interference filter 82 is so characterized as to transmit only a narrow wavelength band of light centered at approximately 805 millimicrons so that photocell 70 will receive substantially only the 805 millimicron light of beam 66 which is directed thereto by lens 78.

The illustrated embodiment of the invention operates on the dual beam principle wherein a difference in the amount or intensities of the 805 and 660 millimicron light as diffusely reflected from a blood sample provides a measure of oxygen saturation of the sample, a variable area light attenuator 84 is positioned to intercept light directed along axis 60 so as to provide means for varying the amount of 660 millimicron light incident upon photocell 68. As it will become readily apparent hereinafter, rotational adjustment of light attenuator 84 allows more or less light to pass therethrough. In this way, a difference in the intensities of the 660 and 805 millimicron light impinging upon respective photocells 68 and 70 can be determined by the amount of adjustment required of light attenuator 84 to match the intensity of the 660 millimicron light with that of the 805 millimicron light. The amount of light attenuated by light attenuator 84 is a measure of the ratio in intensities of light reflected by the blood sample and is a function of oxygen saturation.

Photocells 68 and 70 respond to light impinging thereon each producing an electrical output which corresponds in magnitude to the amountor intensity of light respectively received thereby. Such output of photocells 68 and 70 is fed through an electrical amplifying and coupling circuit to be described in detail hereinafter which operates meter 86 on panel 26 (see FIGS. 1, 4 and 9). A deflection of pointer 88 on meter 86 indicates an imbalance of light received by photocells 68 and 70. With pointer 88 not deflected or centered at an indicating mark 90 on meter 86, indication is given that light attenuator 84 is so adjusted as to balance the intensities of light impinging upon respective photocells 68 and 70.

Referring more particularly to details of light attenuator 84, it will best be seen in FIGS. 2, 3 and 4 that attenuator 84 embodies partially transparent and partially opaque disc 92 mounted upon shaft 94. Shaft 94 is journalled in extensions 96 and 98 of casting 32. Disc 92 is mounted coaxially upon shaft 94 by the provision of sleeve 95.

Sleeve 95 is extended through central opening 97 in disc 92 and is cemented, splined or otherwise fixed to disc 92. After being placed on shaft 94, sleeve 95 is clamped to shaft 94 with set screw 100 to render shaft 94 and disc 92 rotatable together as a unit.

As shown in FIGS. 2 and 4, disc 92 is of a diameter such as to extend fully into the path of light directed along axis 60 thereby occluding all light from photocell 68 except the portion thereof which passes through transparent section 102 (see FIG. 2) of disc 92.

In accordance with one aspect of the invention, disc 92 may be made of opaque metal having a spiral slot of variable width in the direction of the radius of the disc, or it may be of clear glass 104 having an opaque film 106 laminated on one side and having a spiral transparent section 102 of variable width along the direction of the radius of the disc. Disc 92 is so situated that the locus of optical axis 60 remains at a constant radial distance from axis 93 through the center of disc 92 so that it always passes through substantially the center of said slot or spiral transparent section as the disc is rotated. The spiral transparent section does not extend entirely around the disc so there is one part of the disc which will entirely occlude light passing along axis 60.

At one of its ends, transparent section 102 is of such a width dimension as to permit substantially all light passing through interference filter 76 to impinge upon photocell 68 and at its opposite narrowest end, nearly all of said light will be occluded; section 102 being progressively variable in width between opposite ends thereof.

Disc 92 is provided with rim 108 and scale 110 is held upon rim 108 with spring retaining member 109. Scale 110 is provided with graduations 112 calibrated in accordance with corresponding diametrically opposed widths of transparent section 102. As mentioned hereinabove, the amount of light attenuated by light attenuator 84, being a measure of the ratio in intensities of light reflected by the blood sample is a function of oxygen saturation. Thus, scale 110 is calibrated to read percentage of oxygen saturation and graduations 112 are plotted in accordance with corresponding variations in the width or transparent section 102 so that the amount of light attenuated by attenuator 84 will be directly indicated by scale 110 as percentage of oxygen saturation. Magnifying lens 114 (see FIGS. 1 and 4) is provided on panel 26 through which scale 110 is viewed and reference line 116 (see FIG. 1) is provided on lens 114 against which accurate readings of calibrations 112 are made.

In providing for manual operation of light attenuator 84, operating knob 118 having knurled edged 120 is fastened to the depending end of shaft 94. Panel 26 is provided with slotted opening 122 (see FIGS. 1 and 4) through which edge 120 of knob 118 extends so as to be accessible for operation with the thumb or fingers.

Rotation of knob 118 causes rotation of attenuator 84 and adjustment of the width dimension of transparent section 102 in the path of light directed along axis 60.

Support 28 for cuvette 30 extends forwardly from casting 32 and is provided with transparent glass plate 124 (see FIGS. 4 and 6) centered over mirror 54. Cuvette 30, containing a blood sample B to be tested for oxygen content is seated upon plate 124 and caused, by the provision of locating ring 126 to be centered upon axis 53 (see FIG. 2) along which light is directed upwardly from mirror 54. Ring 126 has central opening 128 adapted to freely receive cuvette 30 whose base is seated directly upon plate 124. In order to avoid the possibility of having stray light enter optical system 34 by reflection from plate 124, the underside of plate 124 may be provided with a light absorbing reflection reduction coating (not shown) such as a "flock" or black paint throughout portions thereof surrounding the area over which the base of cuvette 30 is seated.

It is important that the base of cuvette 30 be perfectly clean when positioned upon plate 124 so as to provide for maximum reflection of light from sample B.

In order to provide means for conveniently examining the bottom of cuvette 30, the upper surface of ring 126 is formed to a concave cylindrical shape and provided with a mirror finish. Thus, prior to seating cuvette 30 upon plate 124 it can be held nearly upright adjacent the mirror surface of ring 126 whereby the concave mirror surface of ring 126 will provide a magnified mirror image of the bottom of cuvette 30. In this way, the bottom of cuvette 30 can be conveniently examined for cleanliness immediately prior to being positioned on plate 124 without the danger of spilling sample B.

Prior to testing a blood sample B for oxygen saturation, instrument 10 is standardized to read percentage oxygen saturation accurately and following the testing of each blood sample, the instrument is checked for accuracy.

In accordance with a feature of the present invention, instrument 10 is standardized so that all readings of percentage oxygen saturation are absolute values of oxygen saturation independent of the geometry of the instrument. In order to accomplish this, standard 130 mounted upon hinged holder 132 is arranged upon support 28 to be selectively swung into position against plate 124 before and after the performance of each test made with cuvette 30 (see FIGS. 1, 2, 3 and 6).

Standard 130 is of substantially the same shape and size as the base of cuvette 30. Holder 132 is so hinged upon support 28 as to cause standard 130 to seat flatly against plate 124.

Standard 130 is formed of a material such as ceramic tile or colored glass which is selected to be of such character as to diffusely reflect 805 and 660 millimicron light in precisely the same ratio as whole blood of a predetermined oxygen saturation such as for instance 85%. It is pointed out that the use of standard 130 for standardization of the instrument produces the same result as would be obtained if oxygenated whole blood was used in its place and it will become apparent as this description progresses that the instrument is literally standardized for whole blood. Each time standard 130 is positioned against plate 124, light attenuator 84 must be set so as to cause graduations 112 thereon to read 85% oxygen saturation at reference line 116.

In accordance with another feature of the invention, a setting mechanism best illustrated in FIGS. 3, 6 and 7 and designated generally as 136 is provided to automatically set attenuator 84 to such position as to read the above-mentioned predetermined oxygen saturation each time standard 130 is caused to swing into a position of use against plate 124.

Mechanism 136 is operated by actuation of control arm 138 (see FIGS. 1 and 3) which also functions simultaneously to swing standard 130 toward and away from plate 124.

Referring more particularly to FIGS. 3 and 6, it will be seen that control arm 138 is secured to one end of shaft 140 which is extended horizontally through casting 32. Shaft 140 is rotatably supported in bearing block 142 adjacent control arm 138 and is journalled in casting 32 adjacent its opposite end. Splined to the terminal end of shaft 140 and extending rearwardly in cabinet 22 is lever 144. Lever 144, in the embodiment illustrated, is formed of sheet metal blanked to the configuration best shown in FIG. 6. Lever 144, when raised and lowered by actuation of control arm 138 functions to swing standard 130 toward and away from plate 124 and, at the same time, operate setting mechanism 136.

In its operation relating to standard 130, lever 144 is provided with a bifurcated end portion 146 (see FIGS. 6 and 8) fitted over pin 148 extending laterally from rod 150. Rod 150 is supported for vertical sliding movement in extensions 152 and 154 of casting 32. Secured to rod 150 is block 156 carrying camming pin 158. Pin 158 engages vertically disposed spring tempered cam wire 160 having its lowermost end secured in extension 162 of casting 32. Cam wire 160 is biased against pin 158.

The uppermost end of cam wire 160 is linked by means of sliding connection 164 (see FIG. 8) to pivot arm 166 which hinges holder 132 to support 28. Sliding connection 164 is made with a wire loop 168 fastened to arm 166 through which the upper end of cam wire 160 is directed.

As it can be seen in FIG. 8, the upper portion of cam wire 160 is offset from its lower portion by the provision of bends 170 and 172 so that when camming pin 158 moves above bend 170, cam wire 160 will move to the left as viewed in FIG. 8. In so doing, it will cause arm 166 to rotate clockwise also as viewed in FIG. 8. This swings holder 132 carrying standard 130 upwardly and away from plate 124. When camming pin 158 is moved below bend 170, cam wire 160 is caused to move in an opposite direction or to the right as viewed in FIG. 8 causing arm 166 to rotate counterclockwise. This swings holder 132 downwardly and positions standard 130 against plate 124 so as to receive light directed thereonto from filter 54. Thus, with control arm 138 in its raised position, lever 144 and rod 150 are in their lower positions and standard 130 is in a position of use against plate 124. When control arm 138 is depressed, lever 144 and rod 150 are raised and standard 130 is swung away from plate 124.

In addition to its function in operating to raise and lower standard 130, lever 144 provides means for simultaneously actuating setting mechanism 136 which automatically positions light attenuator 84 so that its scale 110 will read 85% oxygen saturation each time standard 130 is positioned against plate 124.

Setting mechanism 136, as best shown in FIGS. 3 and 7, comprises pinion 174 having a single upstanding drive pin 176. Pinion 174 is fixed upon the uppermost end of shaft 94. In mesh with pinion 174 and mounted for rotation on the top of casting 32 is gear 178 which drives pinion 174 to rotate shaft 94. Gear 178 is provided with a pair of drive pins 180 and 182. Gear 178 and pinion 174 are actuated by lever arm 184 which is extended thereover and which, upon engagement with pins 176, 180 and 182, functions to cause rotation of gear 178 and pinion 174.

In order to swing transversely across respective surfaces of pinion 174 and gear 178 for engagement with pins 176, 180 and 182, lever arm 184 is pivotally mounted on stud 186 carried by extension 188 of casting 32. Lever arm 184 is moved toward and away from pins 176, 180 and 182 by rod 190 which, at its end 192, is latched to lever arm 184. The opposite end of rod 190 is extended through a laterally disposed tab part 194 of lever 144 and resiliently connected thereto by a collar and spring arrangement best shown in FIGS. 6, 7 and 8. Collar 196 engages the underside of tab part 194 of lever 144 when lever 144 is moved downwardly and thereby causes rod 190 to pull lever arm 184 toward pins 176, 180 and 182. In engagement with the opposite side of tab part 194 is one end of spring 198 which is held in place on rod 190 by collar 200. Thus, upward movement of lever 144 pushes tab part 194 thereof against spring 198 to resiliently urge rod 190 upwardly and move lever arm 184 away from pins 176, 180 and 182.

Lever arm 184 is, at all times, biased against pins 176, 180 and 182 by spring 202 having one end 204 connected to casting 32 and its opposite end 206 connected to lever arm 184. Spring 198, however, is of such rigidity as to overcome the tension of spring 202 without becoming appreciably compressed while, at the same time providing a resilient connection between lever 144 and lever arm 184.

Lever arm 184 is provided with V-shaped notch 208 which, when moved against drive pin 176, causes pinion 174 to be rotatably driven to the position where pin 176 becomes centered at the base of notch 208 as shown by full line drawing in FIG. 3 and by dot-dash outline in FIG. 7. Drive pin 176 is so located on pinion 174 relative to scale 110 on light attenuator 84 as to cause scale 110 to read 85% oxygen saturation at reference line 116 when pin 176 is centered in notch 208.

Drive pins 180 and 182 are located on gear 178 so as to be disposed along a line parallel to edge 210 of lever arm 184 and slightly spaced therefrom when drive pin 176 is centered in notch 208 as best shown by dot-dash outline in FIG. 7.

When lever arm 184 is moved away from drive pins 176, 180 and 182 so as to permit light attenuator 84 to be freely manually rotated to settings other than 85%, the drive pins will assume different oriented positions in accordance with the particular position to which attenuator 84 is rotatably adjusted.

In functioning to reset attenuator 84, movement of lever arm 184 toward drive pins 176, 180 and 186 causes its edge 210 to first engage whichever pin 180 or 182 is nearest thereto and cause rotation of gear 178 which drives gear 174 to bring pin 176 thereon into approximate alignment with notch 208. Once a side of notch 208 comes into engagement with pin 176, pinion 174 is continued to be driven by pin 176 until centering of pin 176 in notch 208 takes place. At this time, light attenuator 84 is set to read 85% oxygen saturation.

Drive pins 180 and 182 and gear 178 function to bring drive pin 176 into such a position as to enter notch 208 and the inclined sides of notch 208 then take over to center pin 176 for accurate positioning of light attenuator 84.

From the foregoing, it can be seen that when control arm 138 is depressed, lever 144 is raised causing standard 130 to swing upwardly away from plate 124 and permit placement of cuvette 30 in position against plate 124. At the same time, the raising of lever 144 causes rod 190 to move lever arm 184 of setting mechanism 136 away from drive pins 176, 180 and 182 on pinion 174 and gear 178 so as to permit light attenuator 84 to be freely manually adjusted by actuation of knob 118. Spring 141 on lever 144 is provided with a bead or the like 143 at one end (see FIG. 6) which engages knob 118 each time lever 144 is raised. In so doing, bead 143 produces a slight frictional drag on knob 118 to render attenuator 84 more easily adjustable to desired settings without overriding and holds attenuator 84 at a desired setting when knob 118 is released.

With cuvette 30 removed and control arm 138 in its raised position, lever 144 is lowered thereby causing standard 130 to swing into a position of use against plate 124. Lowering of lever 144 simultaneously swings lever arm 184 into engagement with drive pins 176, 180 and 182 thereby causing lever arm 184 to drive gear 178 and pinion 174 of setting mechanism 136 so as to reset light attenuator 84 to a position where calibration on its scale 110 will read the oxygen saturation represented by standard 130 at reference line 116.

In view of the fact that blood particles are irregular in shape, accurate measurements of oxygen saturation above and below 85% require that the blood sample be agitated to keep its particles oriented in random fashion so that light diffusely reflected from the blood particles will average out. If the blood is not agitated, readings of oxygen saturation above 85% will tend to be too high while readings of oxygen saturation below 85% will tend to be too low.

In order to keep blood sample B in cuvette 30 agitated while measuring oxygen saturation thereof, stirrer 212 is placed in cuvette 30 and stirring motor 214 is provided to operate stirrer 212 (see FIGS. 1 and 4).

Stirrer 212 embodies outer cylindrical body part 216 which seats endwise against the upper open end of cuvette 30. Inner member 218 is fitted for rotation coaxially in part 21y (see FIG. 6). Member 218 carries stirring rod 220 which depends into the lower blood containing section of cuvette 30 when stirrer 212 is positioned for use.

Motor 214 which drives stirrer 212 is mounted upon the upper end of rod 150 by the means of bracket 222 which overhangs support 28 for cuvette 30. Drive shaft 224 of motor 214 extends coaxially into stirrer 212 and is provided with drive pin 226 which keys into appropriate slots 228 provided in the upper end of rotatable member 218. With motor 214, stirrer 212 and cuvette 30 in operative relation with each other as illustrated in FIG. 4, depending shouldered portion 230 of bracket 222 engages the upper end of body part 216 of stirrer 212. In this way, the weight of motor 214, bracket 222 and rod 150 tends to secure cuvette 30 firmly against glass plate 124 and hold the cuvette-stirrer assembly together with respective parts thereof in properly aligned and interfitted relation with each other.

As described hereinabove, rod 150 is actuated by control arm 138 which, when depressed, causes rod 150 to move upwardly. Accordingly motor 214 is lifted and lowered by actuation of control arm 138 when it is desired to position a cuvette-stirrer assembly in support 28. In removing a cuvette-stirrer assembly, motor 214 is lifted by depressing arm 138 to disengage drive pin 226 from stirrer 212.

It is pointed out that the combined weight of motor 214, bracket 222 and rod 150 biases the free end of control arm upwardly at all times.

Motor 214 is electrically connected through switch 232 fastened to casting 32 (see FIGS. 6 and 8). Switch 232 is operated by lever 234 fastened to block 156 which is carried by rod 150. Lever 234 is so designed and positioned relative to switch operating button 236 as to cause switch 232 to close and energize motor 214 when cuvette 30 is seated against plate 124. At other adjusted positions of motor 214, switch 232 is opened and motor 214 is not energized.

Referring to FIG. 9 wherein a presently preferred electrical system is schematically illustrated, it will be seen that the system embodies main electrical harness section 240 and amplifier section 242. Sections 240 and 242 are interconnected at terminal strip 244. The various components of sections 240 and 242 are contained within cabinet 22 and electrically connected to a suitable source of current by cord 246 adapted to plug into a conventional service outlet 248 (see FIGS. 1 and 9).

For purposes of illustration, the electrical system of FIG. 9 will be considered herein to be operated on a 115 volt 60 cycle alternating current source supplied by service outlet 248. It should be understood, however, that the system of FIG. 9 may, within the ordinary skills in the art, be modified for operation on other current sources which might be encountered in the field.

Mounted on control panel 26 of instrument 20 is a conventional potentiometer 250 (see FIGS. 6 and 9) of the type having incorporated therein on-off switch 250'. Potentiometer 250 and switch 250' are both operated by rotation of the same knob 252 on panel 26 (FIG. 1).

Connected to switch 250' by leads 254 and 256 is output voltage regulated step down transformer 258. The secondary of transformer 258 supplies current to lamp 40 through leads 260 and 262. Transformer 258 is preferably constructed and arranged to deliver 8 amperes of alternating current at 10 volts to lamp 40.

On panel 26 of instrument 20 is an indicator 264 which comprises a transparent button or disc 266 of colored glass or the like supported in retainer 268 (see FIGS. 1 and 5). Indicator 264 is illuminated by pilot lamp 270 preferably of the conventional 12 volt variety. Pilot lamp 270 is supported by bracket 272 internally of cabinet 22. As best shown in FIG. 9, pilot lamp 270 is electrically connected through the filament of spare lamp 40' by lead 274. Lead 274 is connected from lead 260 to ground at 276. Since lamp 40' is designed to operate at 8 amperes while lamp 270 draws less than a half ampere, current passing through the two filaments in series does not illuminate lamp 40' while lamp 270 is substantially fully illuminated. With spare lamp 40' in position within the lower portion of lamp housing 36 as shown in FIG. 8, indicator 264 will be illuminated by pilot lamp 270. Without spare lamp 40' in circuit with pilot lamp 270, however, pilot lamp 270 will not be illuminated and indicator 264 will be dark. This arrangement is provided to indicate to the user that the spare lamp is in use or missing and a replacement should be obtained. With a spare lamp in position, indicator 264 further serves to indicate whether or not instrument 20 is electrically energized.

Motor 214 is connected across the primary of transformer 258 by leads 278, 278' and 280, 280' so that when switch 250' is off, motor 214 cannot idly run. Motor 214 operates stirrer 212 and operating switch 232 for motor 214 is placed in lead 280'.

Also connected to leads 278 and 280 is the primary of transformer 282 in voltage regulated direct current power supply 284 for amplifier section 242. Power supply 284 is of conventional design embodying voltage regulator tube 286 to assure that a constant voltage is applied to photocells 68, 70.

In section 242, the output of photocells 68 and 70 is fed by leads 288 and 290 respectively into a conventional dual triode stage of direct current amplification employing dual triode amplifier tube 292. The output of respective sections 292' and 292'' of tube 292 is fed by leads 294 and 296 respectively to balanced cathode follower stages 296' and 296'' of dual triode tube 296. The cathodes of follower stages 296' and 296'' are respectively connected to ends of potentiometer 250, the movable tap thereof being connected by lead 306 to the negative side of power supply 284. Meter 86 connected across potentiometer 250 is responsive to the amplitude and direction of potential drop across the potentiometer. Heaters or filaments 292a and 296a of respective tubes 292 and 296 are connected by leads 302 and 304 to the secondary of transformer 258. Meter 86 which is a conventional zero center voltmeter with its pointer 88 centered at indicating mark 90 (see FIG. 1) when the net potential difference across potentiometer 250 is zero. When the outputs of cathode follower stages 296' and 296'' are unequal, either one end of potentiometer 250 or the other will have a value more positive than the other and meter pointer 88 will deflect from indicating mark 90. Thus, a difference in output of photocells 68 and 70 will be registered by deflection of meter pointer 88 relative to indicating mark 90. Equal or balanced output of photocells 68 and 70 will be registered by no deflection of meter pointer 88.

In order to electrically balance amplifier section 242 and compensate for photocell dark current, potentiometer 250 is adjusted by knob 252 to cause meter pointer 88 to become zeroed or centered at indicating mark 90 when photocells 68 and 70 are rendered dark.

Referring more particularly to FIGS. 3 and 5, it will be seen that shutter 308 pivotally mounted on lamp housing 36 is provided to occlude all light from photocells 68 and 70 when balance or compensation for photocell dark current is desired. Shutter 308 is connected by actuating rod 310 to button 312 on panel 26. Spring 314 biases shutter 308 toward panel 26 so that it will normally assume the position illustrated by full line drawing in FIG. 5. When button 312 is depressed, shutter 308 is moved to the position illustrated by dot-dash outline in FIG. 5 so as to intercept light normally passing from lamp housing 36 into optical system 34. This renders optical system 34 and photocells 68 and 70 dark. Upon release of button 312, shutter 308 automatically returns to the positive shown by full line drawing in FIG. 5.

With amplifier section 242 balanced for photocell dark current as just described and with standard 130 in position of use against plate 124 as best shown in FIG. 6 at which time light attenuator 84 is set to read 85% oxygen saturation against reference line 116, instrument 20 may be standardized to compensate for changes in temperature of lamp 40 by operation of variable load resistor 314 associated with photocell 70 (see FIGS. 6 and 9). Resistor 314 is connected by lead 316 to the output of photocell 70 and regulates the output of photocell 70 relative to the output of photocell 68. Thus, differences in output of photocells 68 and 70 whether caused by changes in temperature of lamp 40 or otherwise may be neutralized by adjustment of resistor 314. Resistor 314 is operated by knob 318 on panel 26 (see FIGS. 1 and 6).

For oxygen saturation analysis with instrument 20, a blood sample B is preferably collected and prepared as follows:

Arterial blood may be obtained through a Cournand needle or from an intravascular or intracardiac catheter. If arterial-puncture is not possible, capillary arterial blood may be obtained by puncturing the capillary bed occuring in the patient's finger or ear. In either case, between 1 and 2 ml. of blood is drawn slowly into a syringe whose dead air space has been filled with a 1% heparin solution. Without drawing in air, a small amount of clean mercury is next drawn into the syringe. The syringe is held with its tip up and any air previously trapped therein is expelled. The needle of the syringe is next removed, the syringe capped and gently rotated end for end to mix the heparin and blood; the mercury functioning to assure thorough mixing.

If analysis of the blood must be delayed for more than 10 minutes, the syringe should be stored in ice water; a delay of several hours is then possible.

In preparing the cuvette for analysis of a blood sample, the cuvette is thoroughly cleaned, rendered free of lint or oil and inspected for scratches or other defects. Scratched or otherwise defective cuvettes should not be used. The syringe is again gently rotated end for end to insure complete mixing of the blood's cells and plasma and its cap is replaced with a needle. With the syringe tip held downwardly, all mercury and a small amount of blood is expelled. The needle is next placed within cuvette 30 close to the bottom and a side thereof whereupon remaining blood in the syringe is expelled slowly into the cuvette without foaming or bubbling. At least 1 ml. and preferably nearer 2 ml. of blood should be placed in cuvette 30. About .5 ml. of light mineral oil is added to the surface of the blood in cuvette 30 to prevent interchange between the blood and oxygen in the air. The addition of mineral oil may be omitted if oxygen saturation of the blood is to be measured immediately and if stability of the blood sample beyond approximately 30 seconds is not required and the oxygen saturation of the blood is known to be above 65%. On lower degrees of saturation, the stirring of the blood sample may cause it to pick up enough oxygen to change its value.

Stirrer 212 is placed in cuvette 30 and blood sample B is ready for oxygen saturation analysis with instrument 20.

Instrument 20 is operated as follows:

With cord 246 plugged into a suitable service outlet, instrument 20 is turned on by operation of knob 252 (FIGS. 1 and 6) which closes switch 250' (FIG. 9). Following a warmup period of preferably from 3 to 5 minutes, the instrument is balanced for photocell dark current by depressing button 312 (see FIGS. 1 and 5) which operates shutter 308 to occlude light from optical system 34 so that photocells 68 and 70 are in a dark condition. With button 312 depressed, potentiometer 250 is adjusted by operation of knob 252 to cause pointer 88 of meter 86 to become zeroed or centered at indicating mark 90. Button 312 is then released to return shutter 308 to its initial position wherein optical system 34 is again illuminated.

With control arm 138 in its normal upper position, at which time standard 130 is automatically positioned against plate 124 and scale 110 of light attenuator 84 reads 85% at line 116 (see FIG. 1), instrument 20 is standardized to compensate for changes in lamp temperature. This is accomplished by adjusting resistor 314 with knob 318 until meter pointer 88 again becomes zeroed or centered at indicating mark 90.

Control arm 138 is next depressed with one hand to automatically swing standard 130 away from plate 124 and simultaneously lift motor 214. At this time, cuvette 30 containing blood sample B and having stirrer 212 thereon is centered under motor 214 with drive pin 226 engaged in slots 228 of stirrer 212. While holding cuvette 30 in such position between the fingers of the other hand, motor 214 is slowly lowered by allowing control arm 138 to rise. During lowering of motor 214, cuvette 30 is carefully guided into opening 128 of ring 126 and seated upon plate 124 as shown in FIG. 4.

After allowing a few seconds for stirring of blood sample B, light attenuator 84 is rotated by knob 118 (see FIGS. 1, 3 and 4) until pointer 88 of meter 86 is zeroed or centered on indicating mark 90.

At this time, percentage oxygen saturation of blood sample B may be directly read from scale 110 against line 116 (see FIG. 1).

Cuvette 30 is removed by again depressing control arm 138 and a check for possible instrument drift may be made by releasing control arm 138. Upon release of control arm 138, standard 130 automatically swings into position against plate 124 while at the same time scale 110 on light attenuator is automatically reset to read 85% oxygen saturation in the manner described hereinabove. If no instrument drift has taken place, pointer 88 on meter 86 will be zeroed at indicating mark 90 thereby assuring that the percentage oxygen saturation reading taken of blood sample B was accurate; the reading being an absolute measurement of percentage of oxygen saturation.

From the foregoing, it can be seen that instrument 20 measures the oxygen saturation of unhemolized blood by determining the ratio of light intensities diffusely reflected or back scattered at two wavelengths of light. This eliminates errors which may be caused by the process of hemolization necessary in other optical methods based on measurement of transmitted light. The use of two wavelengths renders the result independent of hematocrit within wide limits and provides accurate results over the entire scale of oxygen saturation from 100% to at least 30% and below.

I claim:

1. Apparatus for determining the percentage of oxygen saturation of whole blood comprising means for supporting a sample of blood to be tested, means for directing light onto said sample of blood to be at least partially reflected thereby, optical means for receiving at least a portion of said light reflected from said sample, said optical means being arranged to divide said portion of reflected light and direct portions thereof along separate paths, a light filter in each of said paths, each of said filters being adapted to transmit light of a preselected band of wavelengths different from the other, means for comparing the intensity of light passed through one of said filters with that passed through the other, optical attenuator means in one of said paths for adjusting the light in said one path to equality with the other, said attenuator means being calibrated in percentage of oxygen saturation in said sample, a reference standard of reflection positioned adjacent said means for supporting said sample, means for substituting said standard for said sample to reflect light from said source into said optical means, and means responsive to said means for moving said standard for positioning said attenuator at a predetermined calibration and an adjustment in said comparing means to cause said comparing means to indicate equality in the quantity of light in each of said paths.

2. Apparatus for determinig the percentage of oxygen saturation of whole blood comprising means for supporting a sample of blood to be tested, means for directing light onto said sample of blood to be at least partially reflected thereby, optical means for receiving at least a portion of said light reflected from said sample, said optical means being arranged to divide said portion of reflected light and direct portions thereof along separate paths, a light filter in each of said paths, each of said filters being adapted to transmit light of a preselected band of wavelengths different from the other, means for comparing the intensity of light passed through one of said filters with that passed through the other, optical attenuator means in one of said paths for adjusting the light in said one path to equality with the other, said attenuator means being calibrated in percentage of oxygen saturation in said sample, a reference standard of reflection positioned adjacent said means for supporting said sample, means for substituting said standard for said sample, to reflect light from said source into said optical means, and means responsive to said means for moving said standard for positioning said attenuator at a predetermined calibration and an adjustment in said comparing means to cause said comparing means to indicate equality in the quantity of light in each of said paths, when said attenuator is at said predetermined calibration and said standard is in said position, said means for positioning said attenuator including an actuating arm and coarse and fine drive means coupled to said attenuator, said actuator arm being positioned to first engage said coarse drive means and thereafter engage said fine drive means.

3. Apparatus for determining percentage of oxygen saturation of whole blood comprising means for interchangeably supporting a blood sample to be tested and a standard adapted to have a light reflectance radio substantially identical to that of whole blood having a known oxygen content for at least two selected wavelengths of light, a source of light, means for projecting light from said source onto said sample and standard when positioned interchangeably on said supporting means therefor, optical means for receiving at least a portion of light reflected from said sample and standard, said optical means being constructed and arranged to divide said portion of reflected light and direct respective parts thereof along separate paths, light filtering means positioned in each of said paths, said filtering means in one of said paths being adapted to pass substantially only light of one preselected wavelength and said filtering means in another of said paths being adapted to pass substantially only light of a different preselected wavelength, a pair of photoe'ectric members, one of said photoelectric members being positioned in each of said paths to receive only light passed through a respective one of said filters, said photoe'ectric members each being adapted to provide an electrical output corresponding to the amount of light received thereby, a meter electrically connected to sa'd photoelectric members, said meter having a pointer adapted to deflect from an established point in response to differences in output of said photoelectric members, a light attenuator positioned to intercept light in one of said paths, said light attenuator being adjustable to vary the amount of light permitted to pass therethrough and impinge upon a respective one of said photoelectric members so as to render its output variable according to adjustment of said light attenuator, scale means on said light attenuator having calibrations arranged to read percentage of oxygen saturation directly in accordance with adjustment of said light attenuator, reference means against which said calibrations are adapted to be read, means for automatically setting said light attenuator and scale means so as to read percentage oxygen saturation correctly in accordance with light reflected from said standard when said standard is positioned to receive light from said source and means for adjusting the output of one of said photoelectric members relative to the other to render said pointer on said meter not deflected when said standard is positioned to receive light whereby when said blood sample is positioned to receive light and said light attenuator is adjusted to render the output of one of said photoelectric members equal to that of the other photoelectric member, as indicated by said meter, said calibrations will read absolute values of percentage of oxygen saturation of said sample.

4. The apparatus of claim 3 further characterized in that said light attenuator is supported for rotation on a shaft and said setting means includes a pinion on said shaft, a gear in mesh with said pinion, an upstanding drive pin on a side of said pinion and a number of similar drive pins on said gear, an actuating arm adapted to be moved into driving engagement with said pins for rotating said light attenuator to a desired setting and means for selectively moving said actuating arm toward and away from said drive pins.

5. The apparatus of claim 4 further characterized in that said actuating arm is provided with a V-notch for receiving said drive pin on said pinion and said drive p'n is so radially positioned on said pinion as to cause said light attenuator to assume sa'd desired setting when centered in said notch on said actuating arm.

6. Apparatus for determining percentage of oxygen saturation of whole blood comprising means for interchangeably supporting a blood sample to be tested and a standard adapted to have a light reflectance ratio substantially identical to that of whole blood having a known oxygen content for at least two selected wavelengths of light, a source of light, means for projecting l'ght from said source onto said sample and standard when positioned interchangeably on said supporting means therefor, optical means for receiving at least a portion of l'ght reflected from said sample and standard, said optical means being constructed and arranged to divide sa'd portion of reflected light and direct respective parts thereof along separate paths, light filtering means positioned in each of said paths, said filtering means in one of said paths being adapted to pass substantially only light of one preselected wavelength and said filtering means in another of said paths being adapted to pass substantially only light of a different preselected wavelength, a pair of photoelectric members, one of said photoelectric members being positioned in each of said paths to receive only light passed through a respective one of said filters, said photoelectric members each being adapted to provide an electrical output corresponding to the amount of light received thereby, a meter electrically connected to said photoelectric members, said meter having a pointer adapted to deflect from an established point in response to differences in output of said photoelectric members, means for selectively occluding light from said source to render said photoelectric members temporarily dark, means for electrically balancing said meter to prevent deflection of said pointer when said photoelectric members are rendered dark, a light attenuator positioned to intercept light in one of said paths, said light attenuator being adjustable to vary the amount of light permitted to pass therethrough and impinge upon a respective one of said photoelectric members so as to render its output variable according to adjustment of said light attenuator, scale means associated with said light attenuator having calibrations arranged to read percentage of oxygen saturation directly in accordance with adjustment of said light attenuator, reference means against which said calibrations are adapted to be read, means for automatically setting said light attenuator and scale means so as to read percentage of oxygen saturation correctly in accordance with light reflected from said standard when said standard is positioned to receive light from said source and means for adjusting the output of one of said photoelectric members relative to the other to render said pointer on said meter not deflected when said standard is positioned to receive light whereby when said blood sample is positioned to receive light and said light attenuator is adjusted to render respective amounts of light impinging upon said photoelectric members equal as indicated by no deflection of said pointer from said established point on said meter, said calibrations will read absolute values of percentage of oxygen saturation of said sample.

7. Apparatus for determining percentage of oxygen saturation of whole blood comprising means for interchangeably supporting a blood sample to be tested and a standard adapted to have a light reflectance ratio substantially identical to that of whole tblood having a known oxygen saturation for at least two selected wavelengths of light, a source of light, means for projecting light from said source onto said sample and standard when positioned interchangeably on said supporting means therefor, optical means for receiving at least a portion of light reffected from said sample and standard, said optical means being constructed and arranged to divide said portion of reflected light and direct respective parts thereof along a pair of separate paths, light filtering means in each of said paths, said filtering means in a first of said paths being adapted to pass only light of approximately 805 millimicrons, said filtering means in a second of said paths being adapted to pass only light of approximately 660 millimicrons, first and second photoelectric members, said first photoelectric member being positioned in said first path to receive substantially only said 805 millimicron light said second photoelectric member being positioned in said second path to receive substantially only said 660 millimicron light, said photoelectric members each being adapted to produce an electrical output corresponding to the amount of light received thereby, a meter electrically connected to receive said output of said first and second photoelectric members, said meter having a pointer adapted to deflect from an established point in response to differences in output of said photoelectric members, means for selectively occluding light from said source to render said photoelectric members temporarily substantially dark, means for electrically balancing said meter to prevent deflection of said pointer from said established point when said photoelectric members are rendered dark, a light attenuator positioned to intercept one of said paths of light, said light attenuator being adjustable to selectively vary the amount of light permitted to pass therethrough and impinge upon a respective one of said photoelectric members, the output of said one photoelectric member being variable according to adjustment of said light attenuator, scale means on said light attenuator having calibrations arranged to read percentage of oxygen saturation directly in accordance with adjustment of said light attenuator, reference means against which said calibrations are adapted to be read, means for automatically presetting said scale means to read percentage oxygen of saturation correctly in accordance with said standard when said standard is positioned to receive light from said source and means for rendering the output of one of said photoelectric members equal to that of the other when said standard is positioned to receive light whereby when said blood sample is positioned to receive light and said light attenuator is adjusted to render respective amounts of light impinging upon said photoelectric members equal as indicated by said meter, said calibrations will read absolute values of percentage of oxygen saturation of said sample.

8. Apparatus of the character described comprising a station for supporting a blood sample to be tested in a predetermined position on said apparatus, a standard adapted to have a light reflectance ratio substantially identical to that of whole blood having a known oxygen content for at least two selected wavelengths of light, means for selectively moving said standard to said predetermined position when said blood sample is removed therefrom, a source of light, means for projecting light from said source onto said sample and standard when positioned interchangeably at said station, optical means for receiving at least a portion of light reflected from said sample and standard, said optical means being constructed and arranged to divide said portion of reflected light into two parts and direct respective parts thereof along separate paths, a light filter means positioned in each of said paths, a pair of photoelectric members, one of said photoelectric members being positioned in each of said paths to receive substantially only light passed through a respective one of said filters, said photoelectric members being adapted to provide an electrical output corresponding to the amount of light received thereby, a meter electrically connected to receive said output of said photoelectric members, said meter having a pointer adapted to deflect from an established zero position in response to differences in output of said photoelectric members, a rotatable variable area light attenuator intercepting one of said paths of light, said light attenuator being adjustable by rotation to vary the amount of light permitted to pass therethrough and impinge upon a respective one of said photoelectric members to render the output of said one photoelectric member variable according to adjustment of said light attenuator, scale means on said light attenuator having calibrations arranged to read percentage of oxygen saturation directly in accordance with rotational adjustment of said light attenuator, reference means against which said calibrations are adapted to be read, means for automatically rotatably adjusting said attenuator and scale means to read percentage of oxygen saturation correctly in accordance with light reflected from said standard when said standard is moved to such position as to receive light from said source and means for adjusting said meter to cause said pointer to indicate zero deflection when said standard is positioned to receive light whereby when said blood sample is positioned to receive light and said light attenuator is adjusted to render respective amounts of light impinging upon said photoelectric members equal as indicated by said meter, said calibrations will read absolute values of percentage of oxygen saturation of said sample.

9. Apparatus of the character described for determining percentage of oxygen saturation of a sample of whole blood comprising a transparent container for supporting said sample, a station for receiving and supporting said container in a predetermined poistion on said apparatus stirring means in said container for agitating said blood, means for actuating said stirring means, a standard adapted to have a light reflectance ratio substantially identical to that of whole blood having a known oxygen content for at least two selected wavelengths of light, means for moving said standard to said predetermined position on said apparatus when said blood sample is removed therefrom, a source of light, means for projecting light from said source onto said sample in said container and onto said standard when said container and standard are positioned interchangeably at said station, optical means for receiving at least a portion of light reflected from said sample and standard, said optical means being constructed and arranged to divide said portion of reflected light into two parts and direct respective parts thereof along separate paths, a light filter positioned in each of said paths, a pair of photoelectric members, one of said photoelectric members being positioned in each of said paths to receive substantially only light passed through a respective one of said filters, said photoelectric members being adapted to provide an electrical output corresponding to the amount of light received thereby, a meter electrically connected to receive said output of said photoelectric members, said meter having a pointer adapted to deflect from an established zero position in response to differences in output of said photoelectric members, a variable area light attenuator intercepting one of said paths of light, said light attenuator being adjustable to vary the amount of light permitted to pass therethrough and impinge upon a respective one of said photoelectric members to render the output of said one photoelectric member variable according to adjustment of said light attenuator, scale means on said light attenuator having calibrations arranged to read percentage of oxygen saturation directly in accordance with adjustment of said light attenuator, reference means against which said calibrations are adapted to be read, means for automatically rotatably adjusting said attenuator and scale means to read percentage of oxygen saturation correctly in accordance with light reflected from said standard when said standard is moved to such position as to receive light from said source and means for adjusting said meter to cause said pointer to indicate zero when said standard is positioned to receive light at said station whereby when said blood sample in said container is positioned to receive light at said station and said light attenuator is adjusted to render respective amounts of light impinging upon said photoelectric members equal as indicated by said meter, said calibrations will read absolute values of percentage of oxygen saturation of said sample.

References Cited by the Examiner
UNITED STATES PATENTS

| | | | |
|---|---|---|---|
| 2,774,276 | 12/1956 | Glasser et al. | 250—226 X |
| 2,938,424 | 5/1960 | Herriott | 88—14 |
| 2,987,182 | 6/1961 | Ator et al. | 88—14.5 X |
| 3,177,757 | 4/1965 | Polanyi | 88—14 |

JEWEL H. PEDERSEN, *Primary Examiner.*

O. B. CHEW, *Assistant Examiner.*